United States Patent
Su et al.

(10) Patent No.: US 12,530,158 B2
(45) Date of Patent: Jan. 20, 2026

(54) SYSTEM AND METHOD FOR DISTRIBUTED PRINT JOB STORAGE AND RETRIEVAL IN CONJUNCTION WITH A BLOCKCHAIN

(71) Applicant: Toshiba TEC Kabushiki Kaisha, Shinagawa-ku (JP)

(72) Inventors: William Su, Riverside, CA (US); Chris Nguyen, Huntington Beach, CA (US)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 323 days.

(21) Appl. No.: 18/367,574

(22) Filed: Sep. 13, 2023

(65) Prior Publication Data

US 2025/0085912 A1    Mar. 13, 2025

(51) Int. Cl.
*G06F 3/12* (2006.01)
*H04L 9/00* (2022.01)

(52) U.S. Cl.
CPC .......... *G06F 3/1273* (2013.01); *G06F 3/1204* (2013.01); *G06F 3/1286* (2013.01); *H04L 9/50* (2022.05)

(58) Field of Classification Search
CPC .... G06F 3/1273; G06F 3/1204; G06F 3/1286; H04L 9/50

USPC ........................................................ 358/1.15
See application file for complete search history.

(56) References Cited

U.S. PATENT DOCUMENTS

| | | | |
|---|---|---|---|
| 11,822,838 B1 * | 11/2023 | Ferrara, Jr. | G06F 3/1222 |
| 2020/0265351 A1 * | 8/2020 | Rohit | H04L 9/3263 |
| 2022/0191034 A1 * | 6/2022 | Adams, III | H04L 9/3236 |
| 2022/0247871 A1 * | 8/2022 | Kampman | G06F 16/2379 |

* cited by examiner

*Primary Examiner* — Allen H Nguyen
(74) *Attorney, Agent, or Firm* — Kim & Stewart LLP

(57) ABSTRACT

A system and method for distributed storage and release of print jobs with a networked fleet of multifunction peripherals (MFSs) employs the Interplanetary File System (IPFS) for document storage with document metadata and document transactions stored on a blockchain housed on nodes formed by the multifunction peripherals. A user sends a print job to the network via a print driver on their local device. The print job is stored in the IPFS by the print driver, and the metadata and document transactions are hashed and stored to the blockchain which is managed by MFP consensus. The print job may be accessed via its content at any MFP for release and printing. Access and printing information is also added to the blockchain.

18 Claims, 7 Drawing Sheets

SYSTEM AND METHOD FOR DISTRIBUTED PRINT JOB STORAGE AND RETRIEVAL IN CONJUNCTION WITH A BLOCKCHAIN

TECHNICAL FIELD OF THE INVENTION

This application relates generally to printing. The application relates more particularly to a distributed print job storage and retrieval system wherein content addressable print jobs are received and stored in each of a fleet of multifunction peripherals in conjunction with metadata disposed in a searchable blockchain.

BACKGROUND OF THE INVENTION

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

MFPs receive and execute print jobs from users. Print jobs may be sent directly to an MFP or retrieved from a cloud server. There is additional cost in providing and maintaining a cloud server. If a cloud server becomes unavailable, users may not have access to their print jobs.

BRIEF DESCRIPTION OF THE DRAWINGS

Various embodiments will become better understood with regard to the following description, appended claims and accompanying drawings wherein:

DETAILED DESCRIPTION OF THE INVENTION

Figure 1:
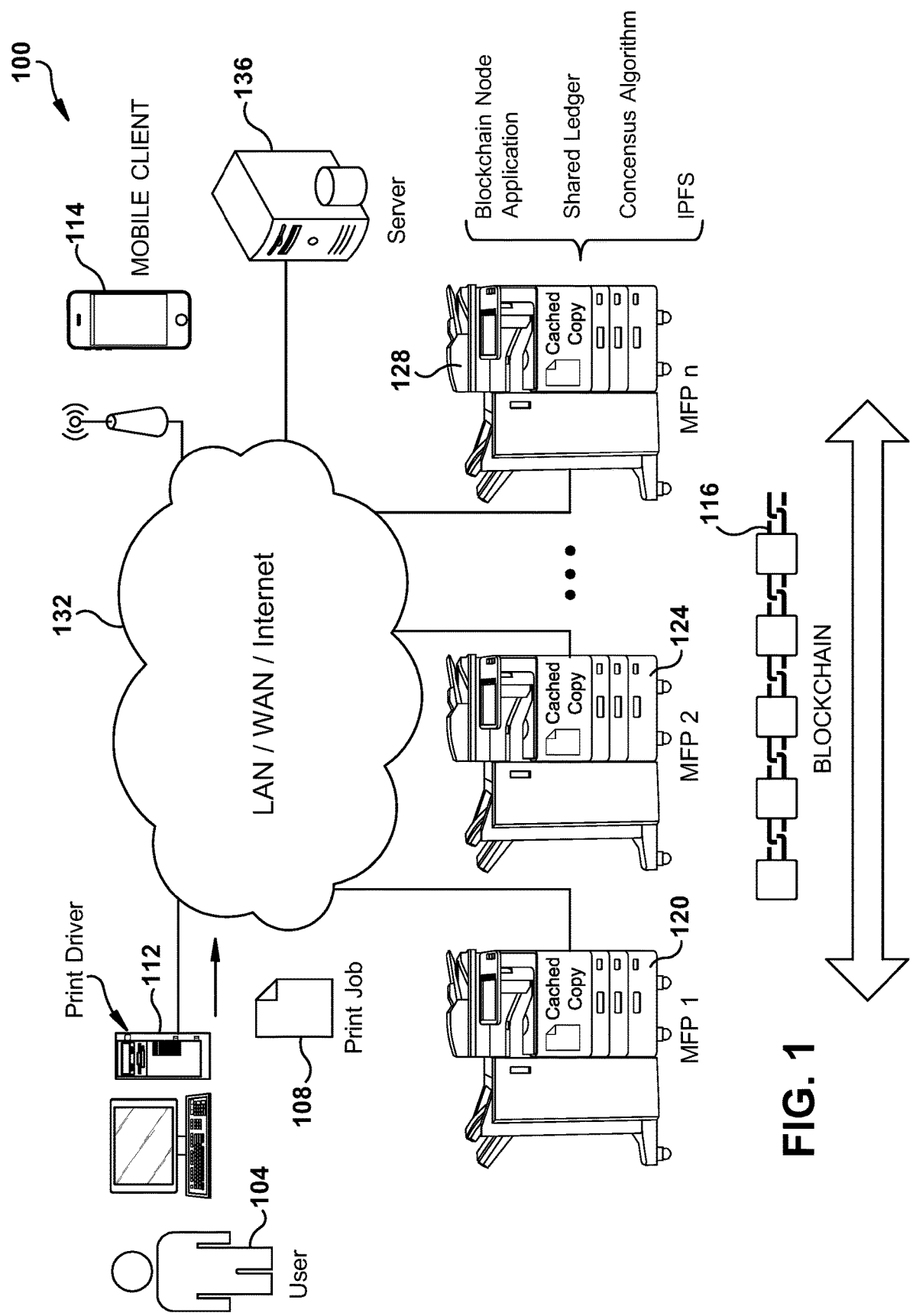
FIG. 1 is an example embodiment of a of a system for distributed print job storage and retrieval in conjunction with a blockchain.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Example embodiments herein provide a mechanism for storing document processing jobs, such as print jobs, in a distributed MFP network using a blockchain.

The InterPlanetary File System, or IPFS, is a distributed peer-to-peer protocol designed to create a content-addressable and decentralized method of storing and sharing data on the Internet. Traditional web protocols like HTTP rely on centralized servers to host and deliver content to users. In contrast, IPFS uses a decentralized network of nodes to store and distribute data. It operates on the principle of content addressing, which means that files are identified by their content rather than their location or a specific server.

Key features of IPFS include:
  Content Addressing: Each piece of data is given a unique cryptographic hash based on its content. This hash serves as the file's address, making it easy to verify and retrieve the data. This also ensures that data remains immutable since any changes to the file would result in a different hash.
  Distributed Network: IPFS uses a distributed network of interconnected nodes to store and share data. When a user requests a file, the IPFS protocol locates the nearest nodes with the data, which improves efficiency and reduces reliance on centralized servers.
  Data Versioning: Since IPFS uses content addressing, it inherently supports versioning. Any modification to a file will result in a new unique hash, preserving the previous version while creating a new one.
  Offline Access: IPFS allows nodes to cache data, enabling users to access content even when they are offline. If the data is available in the local node's cache or in the network nearby, it can be retrieved without needing a connection to the original source.
  Incentive Mechanism: IPFS introduces an incentive mechanism using a cryptocurrency called Filecoin. Users can earn Filecoin by providing storage space to the network and get paid in Filecoin when others request data from their nodes.

IPFS provides for distributing large files, sharing data in a censorship-resistant manner, and enabling decentralized applications (dApps) that rely on distributed data storage.

A blockchain is a decentralized and distributed ledger technology that enables secure and transparent recording of transactions across a network of computers. It operates on a network of computers, called nodes, instead of a central authority.

When someone initiates a transaction, it is broadcast to the network. The network's nodes validate the transaction using specific rules and algorithms. Validated transactions are grouped together into a "block," with each block containing a unique identifier called a hash, which is a cryptographic representation of the block's data.

Each new block includes the hash of the previous block, creating a chain-like structure. This linking mechanism ensures that any alteration to a block would affect all subsequent blocks, making it extremely difficult to tamper with the data.

Before a block is added to the blockchain, the network must agree on its validity through a process called "consensus." Different consensus mechanisms, such as Proof of Work (PoW) or Proof of Stake (POS), help achieve this agreement. Once a block is verified and added to the blockchain, it becomes part of a permanent, immutable record of all transactions that have ever occurred on the network. The cryptographic nature of the linking and verification processes, combined with the distributed nature of the network, ensures security.

The subject application implements blockchain technology. Even though most blockchains are for cryptocurrency such as Toshiba coin, the blockchain can also support print jobs, storing extra information. This information that can be stored works differently from cryptocurrency and can be used to create and manage print jobs.

In example embodiments herein IPFS with a blockchain using a Filecoin, such as Toshiba Coin, stores print jobs using the MFP's storage space. Toshiba coin is a lightweight and non-mined virtual currency operating on a model known as proof of stake. Proof of stake is a method used by cryptocurrency networks to validate and confirm new transactions. There are no high-powered computers and competitions to see who can be the first to validate a block of transactions, which means the costs for this method are lower.

While a cloud server may be used as a centralized location where print jobs can be stored and organized, there is problem wherein, if a cloud server goes offline, clients worldwide will be denied access to their jobs.

Example embodiments herein provide a mechanism for storing print jobs on the blockchain using MFP storage space. Print jobs may be accessible through MFPs located anywhere in the world. Unused storage space on MFP's hard drives worldwide can be used. If any MFP does not have enough disk space or if distributed storage violates a company's policy, the actual print job can just be saved on each business's private cloud. Only a link to the print job will be stored on the blockchain. IPFS is used to store print jobs and a blockchain is used to verify addresses. Every print job uploaded to IPFS is assigned a permanent address. Unlike IPFS, a blockchain is not suitable for storing large numbers of print jobs. In example embodiments herein, a device print driver stores the print job on IPFS and puts the immutable permanent IPFS address into the blockchain transaction. IPFS provides an accessible database, while blockchain makes it verifiable.

IPFS is distributed as print jobs are stored across the network such that all data processing and archiving are not done in the same place. IPFS allows for fast performance and decentralized data archiving. Ownership of a print job and other information such as who printed the print job is recorded on the blockchain.

Example embodiments herein integrate IPFS into a blockchain system. Print file data is are stored on IPFS, and the blockchain contains the references (IPFS hashes) to those files. This approach leverages IPFS's content-addressable storage capabilities to ensure data integrity and decentralization while using the blockchain for other critical aspects of the application. In accordance with the forgoing and detailed description below, example embodiments take advantage of a distributed structure to become more stable and secure. Print jobs are stored on multiple servers, or nodes, all around the world. Print jobs can be retrieved simultaneously, including print jobs from multitude nodes simultaneously. This facilitates tracking print job changes such as who created, edited, paid for, or printed the job, as well as when it was created. As more transactions occur, the blockchain continues to grow, and the process of adding new blocks and reaching consensus is ongoing. This decentralized and immutable nature of blockchain ensures transparency, security, and trust among participants in a network FIG. 1 illustrates an example embodiment of a system 100 for distributed print job storage and retrieval in conjunction with a blockchain. The illustrated system merges the IPFS with blockchain technology to provide decentralization and transparency of print job storage. When a user 104 submits a print job 108, such as via computer 112 or mobile client 114, the print file and associated metadata are uploaded to IPFS. IPFS generates a unique Content Identifier (CID) based on the content, ensuring each print job has a distinct fingerprint.

To manage ownership and actions, a blockchain 116 which resides in each of a plurality of MFPs, such as MFPs 120, 124 and 128, is utilized. The blockchain stores a reference link to the IPFS CID of each print job, enabling the blockchain to verify the existence of print job data without directly storing it. Upon submission, a blockchain transaction records the owner's identity and the IPFS CID, establishing clear ownership.

Throughout the print job lifecycle, various actions are recorded as separate blockchain transactions. Confirmation for printing, cancellation, or completion are all securely documented.

Decentralized print service nodes equipped with IPFS and blockchain capabilities handle the printing process. These nodes validate print job authenticity by querying the blockchain for the IPFS CID. IPFS's content-addressable approach ensures data integrity, making tampering evident by altering the CID. The blockchain's immutability preserves the print job history, preventing any alteration or deletion of records. The combination of IPFS and blockchain fosters a decentralized and transparent ecosystem for print job management, granting users complete control and auditability over their print jobs. Through cryptographic hashing and distributed design, the system guarantees security and authenticity, revolutionizing the way we print and manage print jobs.

Included in FIG. 1 is network cloud 132, suitably comprised of a local area network (LAN), a wide area network (WAN), which may comprise the Internet, or any suitable combination thereof. Network cloud 132 is comprised of any suitable wireless or wired data connection or combination thereof and provides for data transfer between devices such as computer 112, mobile client 114, MFPs 120, 124 and 128 and server 136. Server 136 is suitably integrated into IFPS, and my further undertake assistance in blockchain activity. The MFPs collectively form nodes on IPFS, as well as house and maintain the blockchain.

Figure 2:
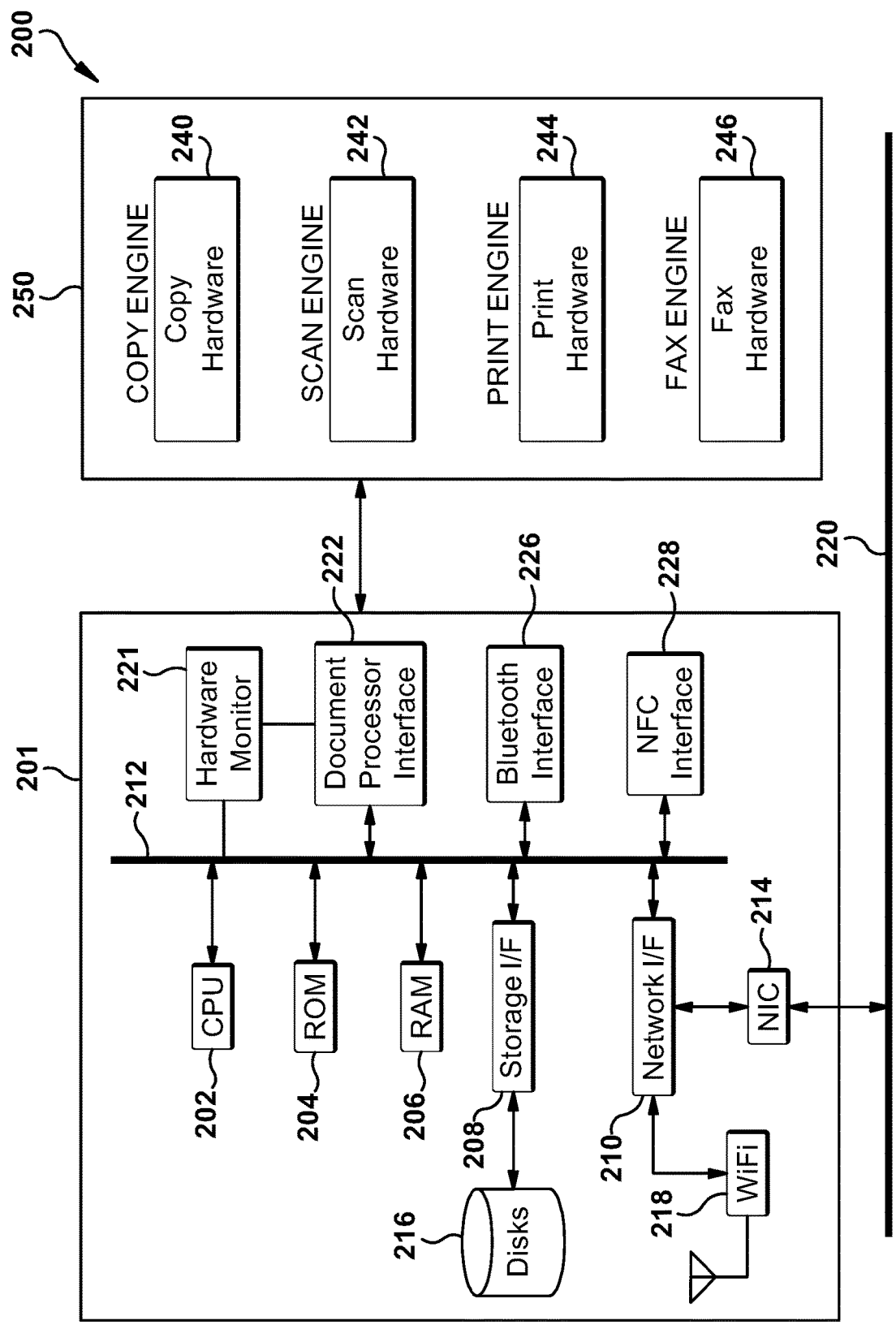
FIG. 2 is an example embodiment of a networked digital device, such as a multifunction peripheral.

Turning now to FIG. 2, illustrated is an example embodiment of a networked digital device comprised of document rendering system 200 suitably comprised within an MFP, such as with MFPs 120, 124 and 128 of FIG. 1. It will be appreciated that an MFP includes an intelligent controller 201 which is itself a computer system. Thus, an MFP can itself function as a server with the capabilities described herein. Included in intelligent controller 201 are one or more processors, such as that illustrated by processor (CPU) 202. Each processor is suitably associated with non-volatile memory, such as read-only memory (ROM) 204, and random access memory (RAM) 206, via a data bus 212.

Processor 202 is also in data communication with input/output interface 222, suitably comprising a user touchscreen. While touchscreens are discussed in example embodiments herein, it is to be appreciated that any suitable user interface, such as keyboards, switches, displays, trackballs or mice may be used.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with additional interfaces, such as Bluetooth interface 226, NFC interface 228 and card reader 232 for data exchange with proximity cards, such as card keys.

Processor 202 is also in data communication with a network interface 210 which provides an interface to a network interface controller (NIC) 214, which in turn provides a data path to any suitable wired interface or physical network connection 220, or to a wireless data connection via wireless network interface 218. Example wireless network interfaces include optical, cellular, Wi-Fi, wireless universal serial bus (wireless USB), satellite, and the like. Example wired interfaces include Ethernet, USB, IEEE 1394 (FireWire), Lightning, telephone line, or the like.

Processor 202 can also be in data communication with any suitable user input/output (I/O) network interface 222 which provides data communication for interfacing with user peripherals, such as displays, keyboards, mice, track balls, touch screens, or the like. Processor 202 can also be in communication with hardware monitor 221, such as a page counter, temperature sensor, toner or ink level sensor, paper level sensor, or the like.

Also in data communication with data bus 212 is a document processor interface 222 suitable for data communication with the document rendering system 250, including MFP functional units. In the illustrated example, these units include a copy engine comprising copy hardware 240, a scan engine comprised of scan hardware 242, a print engine comprised of print hardware 244 and a fax engine comprised of fax hardware 246 which together comprise document rendering system 260. It will be understood that functional units are suitably comprised of intelligent units, including any suitable hardware or software platform.

Figure 3:
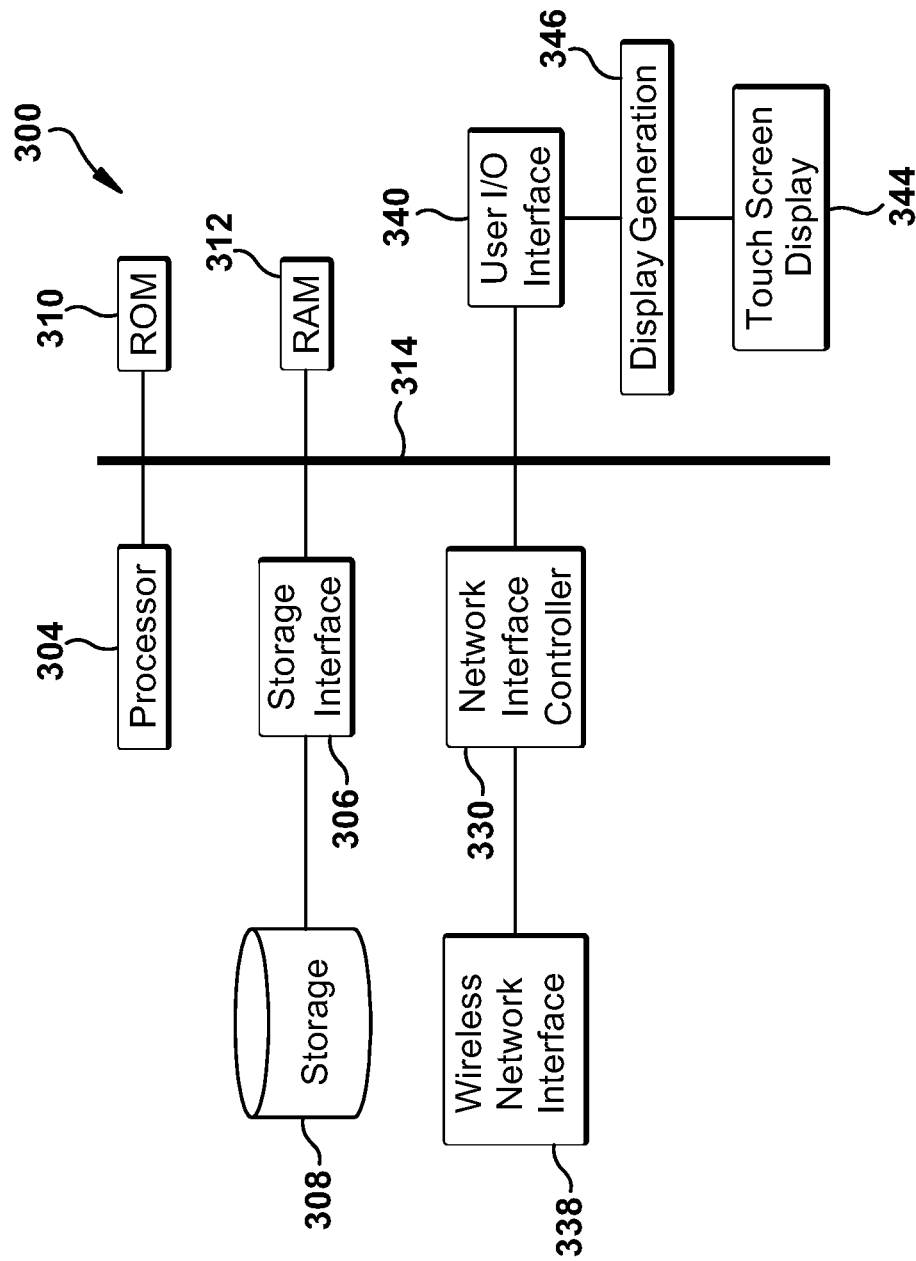
FIG. 3 is an example embodiment of a digital device system.

Turning now to FIG. 3, illustrated is an example embodiment of a digital data processing device 300 such as computer 112, mobile client 114 and server 136 of FIG. 1. It is to be appreciated that some components listed may be unnecessary in certain configurations. Components of the digital data processing device 300 suitably include one or more processors, illustrated by processor 304, memory, suitably comprised of read-only memory 310 and random access memory 312, and bulk or other non-volatile storage 308, suitably connected via a storage interface 306. Data communication among components is accomplished via data bus 314. A network interface controller 330 suitably provides a gateway for data communication with other devices, via any wireless or wired connection, such as via wireless network interface 338. A user input/output interface 340 is suitably comprised of display generator 346 interfacing with touchscreen display 344. As noted above, any suitable user input and display can be used.

Figure 4:
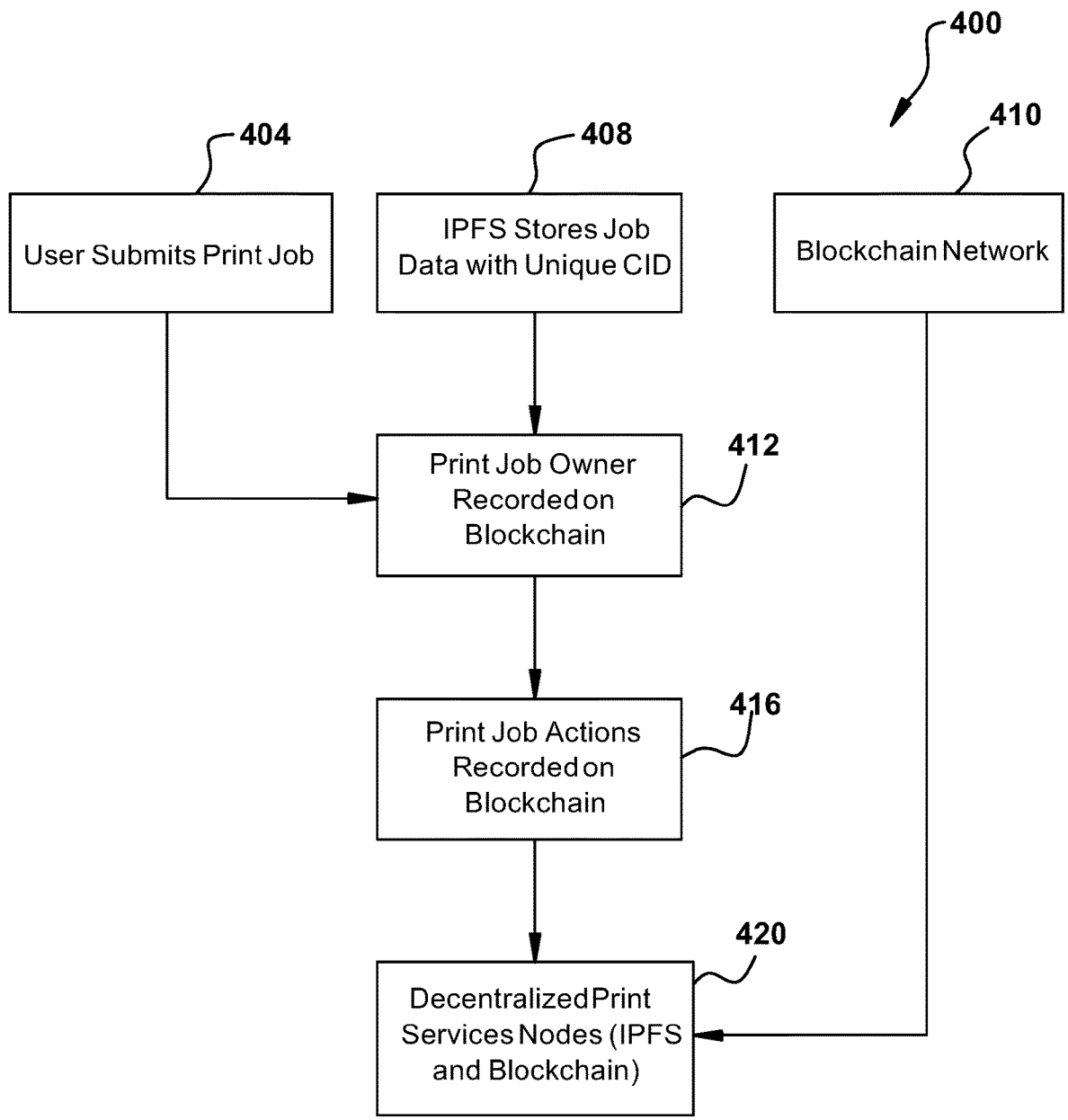
FIG. 4 is an example embodiment of a flow diagram for distributed print job storage and retrieval in conjunction with a blockchain.

FIG. 4 illustrates a flow diagram 400 for an example embodiment of a distributed print job storage and retrieval in conjunction with a block CID at block 408. A user submits a print job at 404 and the blockchain network 410 records the print job owner and establishes ownership at block 412. Throughout the print job lifecycle, various actions are recorded on the blockchain at block 416. Decentralized print service nodes (IPFS & blockchain enabled) handle the printing process, verifying the authenticity of the print job using the blockchain at block 420. The system ensures data integrity and security, providing users with control over their print jobs.

Figure 5:
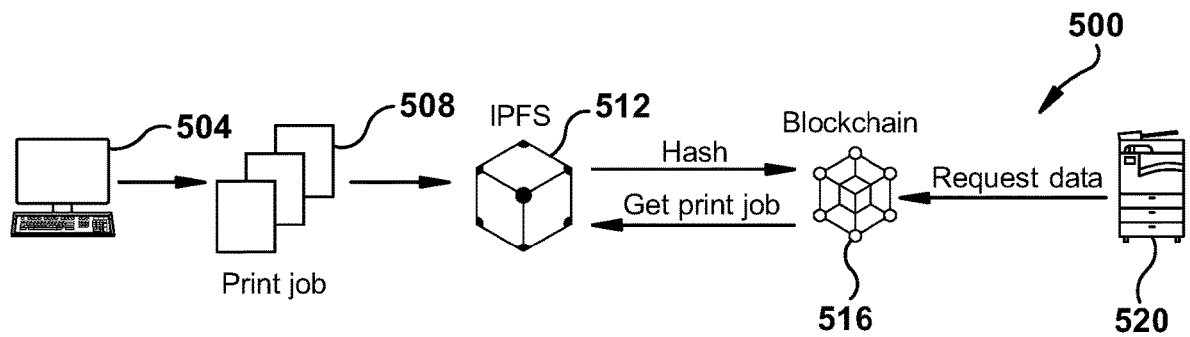
FIG. 5 is an example embodiment of a system overview for distributed print job storage and retrieval in conjunction with a blockchain.

FIG. 5 illustrates an example embodiment of a system overview 500 for distributed print job storage and retrieval in conjunction with a blockchain. User digital device 504 sends print job 508 for storage on IPFS 512. Metadata regarding the print job is hashed and sent to blockchain 516. When a user wishes to release a print job at MFP 520, a request is made to blockchain 516 which then obtains the print job from the IPFS for printing. Activities are then recorded to blockchain 516.

Figure 6:
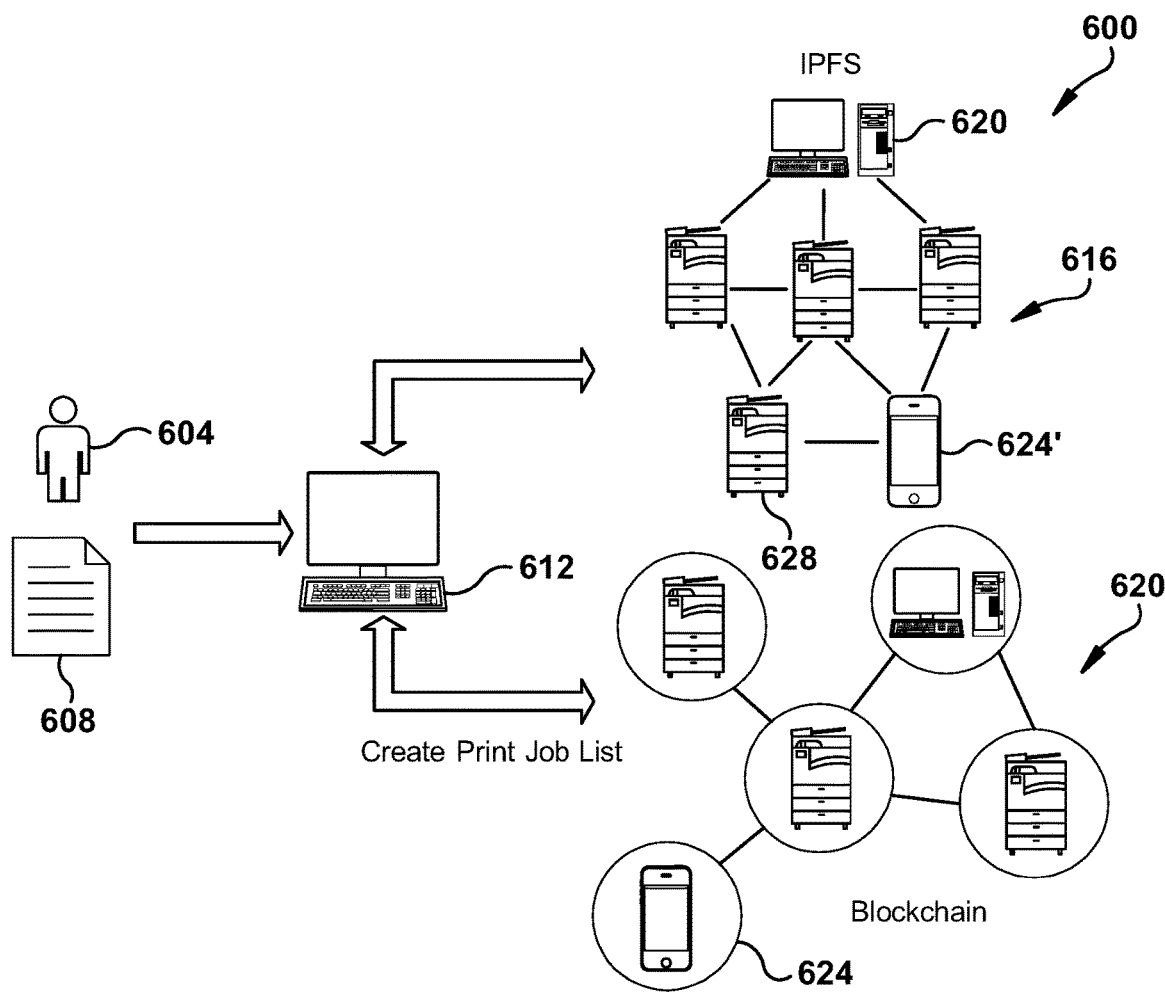
FIG. 6 is an example embodiment of a hardware module block diagram for system for distributed print job storage and retrieval in conjunction with a blockchain

FIG. 6 illustrates an example embodiment of a hardware module block diagram 600 for system 100 for distributed print job storage and retrieval in conjunction with a blockchain. User 604 sends print job 608 via their digital device 612 to multiple networked MFPs 616 working in conjunction with IFPS system 620. The MFPs also function for blockchain storage. The blockchain can be queried via user device 624, which device at 624' may be used to request a print job release and printing by one or more MFP.

Figure 7:
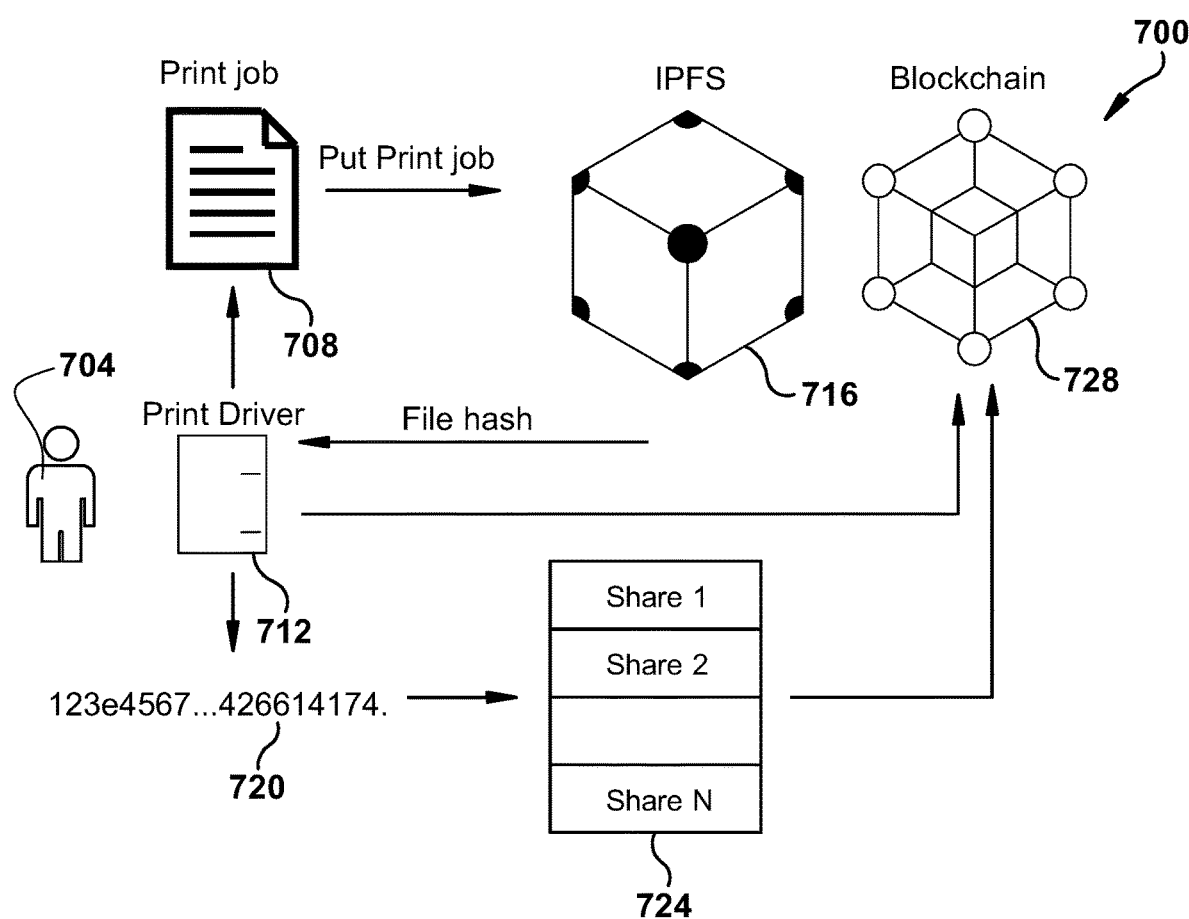
FIG. 7 is an example embodiment of a software module block diagram for a system for distributed print job storage and retrieval in conjunction with a blockchain.

FIG. 7 illustrates an example embodiment of a software module block diagram 700 for a system for distributed print job storage and retrieval in conjunction with a blockchain. In this example, user 704 sends print job 708 from print driver 712 resident on their digital device. Print driver 712 sends print job 708 to IPFS 716 and sends hashed associated metadata 720 as a sequence of chunks 724 for storage in blockchain 728.

Figure 8:
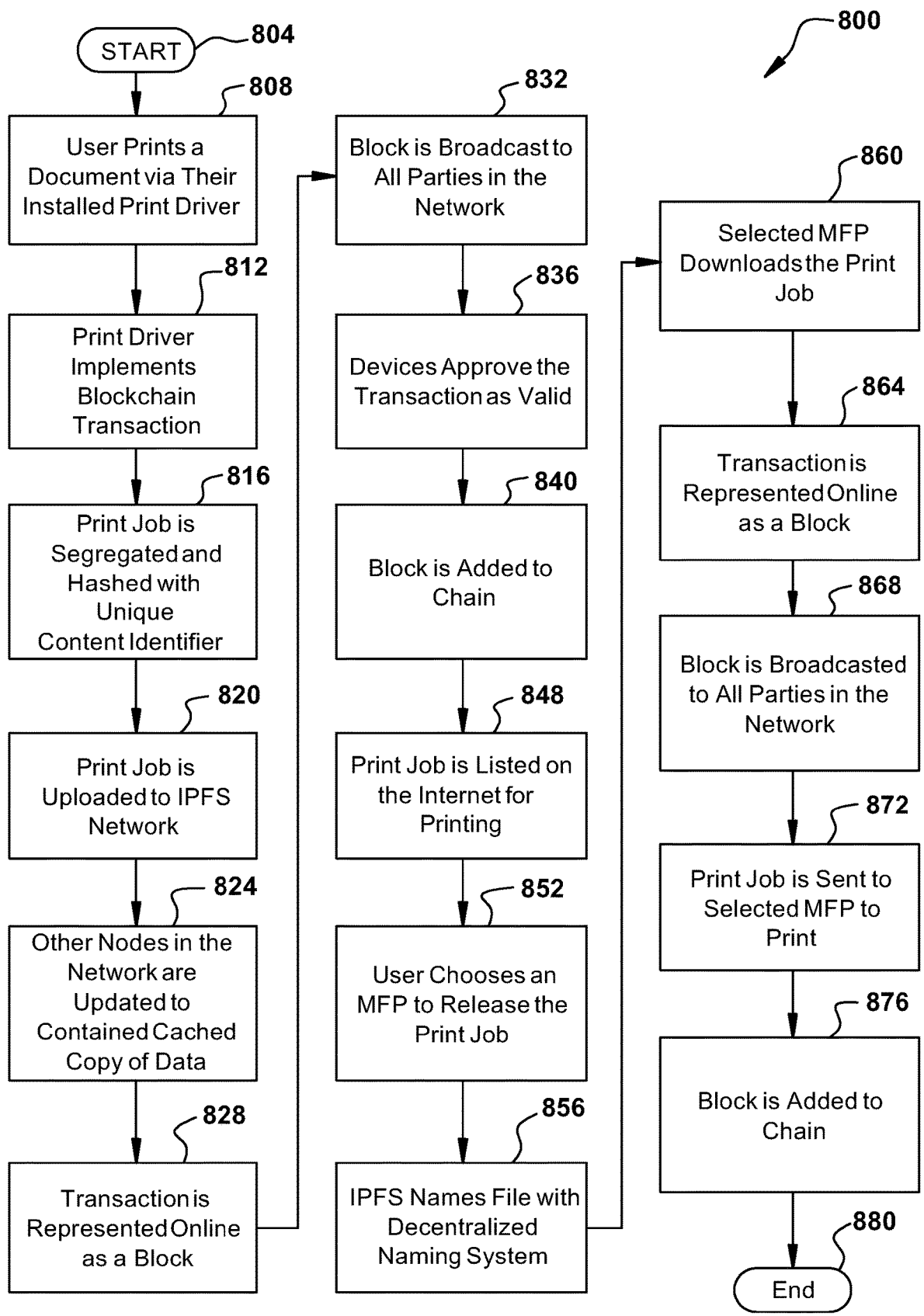
FIG. 8 is an example embodiment of a flowchart for an example embodiment of a system for distributed print job storage and retrieval in conjunction with a blockchain.

FIG. 8 illustrates a flowchart 800 for an example embodiment of a system for distributed print job storage and retrieval in conjunction with a blockchain. The process commences at block 804 and proceeds to block 808 where a user pints a document via a print driver installed in their device. The print driver implements a blockchain transaction at block 812, and the print job is segregated and hashed with a unique CID at block 816. The print job is then uploaded to the IPFS network at block 820, and other network nodes are updated to contain a cached copy of the data at block 824. The associated transaction is represented online as a block at block 828, and this block is broadcast to all parties in the network at block 832. These devices approve a valid transaction at block 836. Once approved, the block is added to the blockchain at block 840. The print job is listed on the Internet for printing at block 848. When a user chooses to release the print job at block 852, the IPFS names the associated file with a decentralized naming system at block 856. A selected MFP downloads the print job at block 860 and the associated transaction is represented online as a block at block 864. The associated block is broadcast to parties in the network at block 868. The print job is then sent to the selected MFP at block 872 and an associated block is added to the chain at block 876. The process then ends at block 880.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
a plurality of networked multifunction peripherals, each multifunction peripheral including a processor, memory, a non-volatile data storage, and a network interface;
a distributed storage system including the non-volatile data storage of each of the plurality of networked multifunction peripherals; and
a blockchain resident in the distributed storage system including the non-volatile data storage of each of the plurality of networked multifunction peripherals,
wherein each of the plurality of networked multifunction peripherals is configured to:
receive print jobs via the network interface of the networked multifunction peripheral;
divide each of the received print jobs into a plurality of fixed-size data blocks;
apply a hash to each of the data blocks for each of the received print jobs;
store the hashed data blocks for each of the received print jobs in the distributed storage system;
assign a unique content identifier to each of the received print jobs; and
record, in the blockchain for each of the received print jobs, (1) print job metadata associated with the received print job and (2) the unique content identifier assigned to the received print job, as part of a transaction.

2. The system of claim 1, wherein the print job metadata for each of the received print jobs includes one or more of: a print job owner identifier, a print job submission date, a print release requestor identifier, a print release date, a print job edit, a print job edit date, and a print cost.

3. The system of claim 2, wherein each of the plurality of networked multifunction peripherals is further configured to:
verify each of a plurality of transactions to be recorded in the blockchain for additional print jobs.

4. The system of claim 3, wherein each of the plurality of networked multifunction peripherals is further configured to:
receive a print job release request associated with one of the received print jobs;
determine a unique content identifier associated with the print job release request;
retrieve, from the distributed storage system, the one of the received print jobs, which is associated with the determined unique content identifier;
record a transaction corresponding to releasing of the one of the received print jobs, in the blockchain;
commence a printout of the one of the received print jobs on one of the plurality of networked multifunction peripherals associated with the print job release request; and
record a transaction corresponding to the printout of the one of the received print jobs, in the blockchain.

5. The system of claim 4, wherein each of the plurality of networked multifunction peripherals is further configured to:
determine the unique content identifier associated with one of the received print jobs in accordance with a query to the blockchain.

6. A method comprising:
storing a blockchain in a distributed storage system that includes non-volatile data storage of each of a plurality of networked multifunction peripherals;
receiving print jobs by one of the plurality of networked multifunction peripherals;
assigning a unique content identifier to each of the received print jobs;
dividing each of the received print jobs into a plurality of fixed-size data blocks;
applying a hash to each of the data blocks for each of the received print jobs;
recording, in the blockchain for each of the received print jobs, the unique content identifier assigned to the received print job as part of a transaction; and
storing the hashed data blocks for each of the received print jobs in the distributed storage system including the non-volatile data storage of each of the plurality of networked multifunction peripherals.

7. The method of claim 6, further comprising:
recording, in the blockchain for each of the received print jobs, print job metadata associated with the received print job.

8. The method of claim 7, wherein the print job metadata for each of the received print jobs includes one or more of: a print job owner identifier, a print job submission date, a print release requestor identifier, a print release date, a print job edit, a print job edit date, and a print cost.

9. The method of claim 8, further comprising:
verifying each of a plurality of transactions to be recorded in the blockchain for additional print jobs, by each of the plurality of networked multifunction peripherals.

10. The method of claim 9, further comprising:
receiving a print job release request associated with one of the received print jobs, by one of the plurality of networked multifunction peripherals;
determining a unique content identifier associated with the print job release request;
retrieving, from the distributed storage system, the one of the received print jobs, which is associated with the determined unique content identifier;
recording a transaction corresponding to releasing of the one of the received print jobs, in the blockchain;
commencing a printout of the one of the received print jobs by one of the plurality of networked multifunction peripherals associated with the print job release request; and
recording a transaction corresponding to the printout of the one of the received print jobs, in the blockchain.

11. The method of claim 10, further comprising:
determining the unique content identifier associated with the one of the received print jobs in accordance with a query to the blockchain.

12. The method of claim 11, further comprising:
retrieving the one of the received print jobs from one or more of the plurality of networked multifunction peripherals.

13. A plurality of non-transitory computer readable storage media storing programs for causing each of a plurality of networked computers to execute a control method for a printing apparatus, the control method comprising:
storing a blockchain in a distributed storage system that includes non-volatile data storage of each of the plurality of networked computers;
receiving print jobs;
assigning a unique content identifier to each of the received print jobs;
dividing each of the received print jobs into a plurality of fixed-size data blocks;
applying a hash to each of the data blocks for each of the received print jobs;

recording, in the blockchain for each of the received print jobs, the unique content identifier assigned to the received print job as part of a transaction;

and storing the hashed data blocks for each of the received print jobs in the distributed storage system including the non-volatile data storage of each of the networked computers.

14. The non-transitory computer readable storage media of claim 13, wherein the control method further comprises;
recording, in the blockchain for each of the received print jobs, print job metadata associated with the received print job.

15. The non-transitory computer readable storage media of claim 14, wherein the print job metadata for each of the received print jobs includes one or more of: a print job owner identifier, a print job submission date, a print release requestor identifier, a print release date, a print job edit, a print job edit date, and a print cost.

16. The non-transitory computer readable storage media of claim 15, wherein the control method further comprises:
receiving a print job release request associated with one of the received print jobs;

determining a unique content identifier associated with the print job release request;

retrieving, from the distributed storage system, the one of the received print jobs, which is associated with the determined content identifier;

recording a transaction corresponding to releasing of the one of the received print jobs, in the blockchain;

commencing a printout of the one of the received print jobs by the printing apparatus, which is associated with the print job release request; and recording a transaction corresponding to the printout of the one of the received print jobs, in the blockchain.

17. The non-transitory computer readable storage media of claim 16, wherein the control method further comprises:
determining the unique content identifier associated with the one of the received print jobs in accordance with a query to the blockchain.

18. The non-transitory computer readable storage media of claim 17, wherein the control method further comprises:
retrieving the one of the received print jobs from one or more of the plurality of networked computers.

* * * * *